UNITED STATES PATENT OFFICE.

CHESTER IVES, OF LONDON, ENGLAND.

PROCESS OF TREATING GELATIN, GLYCERIN, AND BICHROMATE OF POTASH.

SPECIFICATION forming part of Letters Patent No. 623,608, dated April 25, 1899.

Application filed July 25, 1898. Serial No. 686,882. (No specimens.)

*To all whom it may concern:*

Be it known that I, CHESTER IVES, a subject of the Queen of Great Britain, residing at London, in the county of Middlesex, England, have invented a new and useful Process of Treating Gelatin, Glycerin, and Bichromate of Potash to Obtain from Them a Substance of Rubber or Gutta-Percha Like Character, (for which I have obtained a patent in Great Britain, No. 2,887, bearing date February 4, 1898,) of which the following is a specification.

This invention relates to an improved process of treating gelatin or its equivalent, glycerin, and bichromate of potash (potassium bichromate) or its equivalent either alone or in combination with some neutral material as a basis; and it consists in mixing and treating the materials in an anhydrous condition, whereby the chemical action of the bichromate of potash or its equivalent on the gelatin or its equivalent is so retarded that the composition can be conveniently molded or otherwise caused to assume the shape of the desired product before the chemical action has advanced so far as to prevent the perfect adhesion of the molecules of the composition and in subsequently intensifying or hastening the chemical action by the application of heat.

Of the chemical action of bichromate on gelatin nothing is definitely known; but it is generally supposed to be a case of oxidation. It is, however, known that the action of bichromate on gelatin in the presence of water renders the gelatin tough and insoluble in water and that this result is readily obtained if the bichromatized gelatin is exposed to light, and also that in the absence of light time will produce the same result. Further, it is known that the extent of time required to produce the result is greatly influenced by the temperature, being shorter the higher the temperature is. By excluding water, as in my process, I dispense with the necessity of drying, which, as it takes an appreciable time, gives the necessary opportunity for the bichromate to act upon the gelatin, and if the drying is effected, as it usually is, by artificial heat—*i. e.*, at a temperature higher than the atmosphere—the action takes place before the composition can be manipulated to form the desired article. Subsequent application of a higher temperature can then produce little further change, the result being that the product so obtained lacks strength and cohesion.

In carrying this invention into practice I take ordinary commercial gelatin and by means of artificial heat drive off the moisture it contains, which is about twenty-five per cent. of its own weight, in which condition I reduce it by any suitable process to a very fine powder. In this state it is stored in hermetically-sealed receptacles until used, as on exposure to the air it will readily again absorb moisture from the atmosphere. The bichromate of potash or its equivalent is also dried and reduced to a fine powder. The glycerin I employ is known as "anhydrous," as it contains but a mere trace of water, (less than one per cent.,) and is now largely used in the manufacture of dynamite and other explosives. These ingredients are mixed together in suitable proportions, according to the nature of the article to be produced and to the flexibility it is desired the said article shall have—the greater the flexibility or elasticity the larger the amount of glycerin employed. To insure the ingredients being thoroughly mixed, the mass may be subjected to kneading or rolling in suitable machines. Immediately the mass is thoroughly mixed the composition is molded or otherwise treated to give the desired shape or form to the article to be produced and is subjected while under pressure to a temperature ranging from 200° to 300° Fahrenheit, whereby the chemical action of the bichromate on the gelatin is effected in a short space of time.

When it is desired to increase or decrease the weight, bulk, or elasticity of the product, the composition may be adulterated with any suitable neutral substance—such as cork, sawdust, wood fiber, jute, flax, hemp, wool, French chalk or clays—in a powdered or granulated form. For instance, if increased bulk without a corresponding increase in weight is required cork forms a suitable adulterant. An alternative method is to mix the powdered bichromate of potash or its equivalent with the anhydrous glycerin and afterward incorporate it with the powdered gelatin or its equivalent. By this process the action of the bichromate on the gelatin before the composition is molded or otherwise treated is reduced to a minimum, and thus the toughening and strength-giving effect of the chemical action practically only takes place after the composition is in the final form in which it is wanted. Also the necessity for subsequent drying or evaporation is obviated, and consequently the size and weight of the article to be produced can be accurately determined. Further, as no time is taken up by drying or evaporation during the process articles can be produced ready for use in a very short space of time.

What I claim, and desire to secure by Letters Patent, is—

1. The process herein described for producing from a composition of gelatin, bichromate of potash and glycerin either alone or in combination with some adulterating material such as cork, wood-fiber, jute, clays or the like, a substance of rubber or gutta-percha like character which consists in mixing anhydrous gelatin in the form of a fine powder, with anhydrous bichromate of potash also in the form of a fine powder, and the adulterating material if such is used, and adding thereto anhydrous glycerin i. e. glycerin containing not more than one per cent. of water, and in subjecting the mass thus produced when in its desired form or shape to a temperature of from 200° to 300° Fahrenheit under pressure, substantially as set forth.

2. The process of producing from a composition of gelatin, glycerin and bichromate of potash, a substance of rubber or gutta-percha like character, which consists in mixing the ingredients in as nearly an anhydrous state as possible whereby the chemical action set up between the bichromate of potash and the gelatin is sufficiently inactive to allow time for molding or otherwise causing the composition to assume the shape of the desired product before the chemical action has advanced so far as to prevent the perfect adhesion of the molecules of the composition, molding the composition under pressure, and heating it while under pressure to a temperature of from 200° to 300° Fahrenheit substantially as described.

CHESTER IVES.

Witnesses:
ROBERT E. PHILLIPS,
WILLIAM H. JAMES.